United States Patent
Joiner et al.

(10) Patent No.: US 11,493,988 B2
(45) Date of Patent: Nov. 8, 2022

(54) GUIDANCE INFORMATION RELATING TO A TARGET IMAGE

(71) Applicant: AURASMA LIMITED, Bracknell (GB)

(72) Inventors: David Clinton Joiner, Alpharetta, GA (US); Marcus Thomas, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 787 days.

(21) Appl. No.: 16/066,225

(22) PCT Filed: Apr. 29, 2016

(86) PCT No.: PCT/EP2016/059625
§ 371 (c)(1),
(2) Date: Jun. 26, 2018

(87) PCT Pub. No.: WO2017/186303
PCT Pub. Date: Nov. 2, 2017

(65) Prior Publication Data
US 2020/0272223 A1    Aug. 27, 2020

(51) Int. Cl.
*G06F 3/01* (2006.01)
*G06T 7/73* (2017.01)
(Continued)

(52) U.S. Cl.
CPC .......... *G06F 3/011* (2013.01); *G06F 3/04815* (2013.01); *G06T 7/74* (2017.01);
(Continued)

(58) Field of Classification Search
CPC ........ G06F 3/011; G06F 3/04815; G06T 7/74; G06T 19/006; G06T 2207/30244;
(Continued)

(56) References Cited

U.S. PATENT DOCUMENTS

| | | |
|---|---|---|
| 8,587,612 B2 | 11/2013 | Fahn et al. |
| 8,903,430 B2 | 12/2014 | Sands et al. |

(Continued)

FOREIGN PATENT DOCUMENTS

| | | |
|---|---|---|
| CN | 105408937 | 3/2016 |
| WO | WO-2014089245 | 6/2014 |
| WO | WO-2015167515 | 11/2015 |

OTHER PUBLICATIONS

Kim, E. et al. "Fine Dust in Augmented Reality: Creating Public Service Announcement." Compusoft vol. 3, No. 11 (Nov. 2014): 1245-1248.

*Primary Examiner* — Jeffery A Brier
(74) *Attorney, Agent, or Firm* — HP Inc. Patent Department (57) ABSTRACT

In some examples, an electronic device receives selection of a target image relating to an augmented reality presentation, displays, in a display screen of the electronic device, captured visual data of an environment acquired by the electronic device, and displays, in the display screen, guidance (Continued)

information relating to the target image to assist a user in finding a physical target, corresponding to the target image, in the captured visual data of the environment.

15 Claims, 5 Drawing Sheets

(51) Int. Cl.
- G06F 3/04815 (2022.01)
- G06T 19/00 (2011.01)
- G06V 20/20 (2022.01)
- A63F 13/48 (2014.01)
- A63F 13/53 (2014.01)
- A63F 13/5255 (2014.01)

(52) U.S. Cl.
CPC ............ G06T 19/006 (2013.01); G06V 20/20 (2022.01); *G06T 2207/30244* (2013.01)

(58) Field of Classification Search
CPC .... G06K 9/00671; G06V 20/20; A63F 13/48; A63F 13/53; A63F 13/5255
See application file for complete search history.

(56) References Cited

U.S. PATENT DOCUMENTS

| | | | |
|---|---|---|---|
| 2010/0328344 A1* | 12/2010 | Mattila | H04W 4/021 345/633 |
| 2011/0300876 A1* | 12/2011 | Lee | G01C 21/362 455/456.1 |
| 2013/0170697 A1 | 7/2013 | Zises | |
| 2013/0231857 A1* | 9/2013 | Beaurepaire | G01C 21/20 701/428 |
| 2014/0002443 A1 | 1/2014 | Cunningham | |
| 2014/0092134 A1* | 4/2014 | Nagasawa | B60R 1/00 345/633 |
| 2014/0111547 A1 | 4/2014 | Bilberry | |
| 2014/0185871 A1 | 7/2014 | Ito et al. | |
| 2014/0267868 A1 | 9/2014 | Mazzola et al. | |
| 2015/0035857 A1 | 2/2015 | Lowe et al. | |
| 2015/0235432 A1 | 8/2015 | Bronder | |
| 2016/0035138 A1* | 2/2016 | Kim | G06K 9/00 345/633 |
| 2017/0053545 A1* | 2/2017 | Yang | G06T 19/006 |
| 2018/0218218 A1* | 8/2018 | Madan | G06F 1/163 |

* cited by examiner

GUIDANCE INFORMATION RELATING TO A TARGET IMAGE

BACKGROUND

Augmented reality provides a presentation of a physical, real-world environment that is augmented by additional information, such as audio data, video data, image data, text data, and so forth. For example, a camera of an electronic device can capture the image or video of a physical target. An augmented reality presentation of the physical target can then be displayed by the electronic device, where the augmented reality presentation of the physical target includes the image or video of the physical target, along with additional data such as any of those listed above.

BRIEF DESCRIPTION OF THE DRAWINGS

Some implementations of the present disclosure are described with respect to the following figures.

DETAILED DESCRIPTION

Generally, an augmented reality presentation can be created in response to capture of an image or video of a real-world physical target. As examples, the physical target can be a picture in a magazine or newspaper, a picture on a product box, a geographic landmark, a piece of equipment, furniture, a vehicle, a person, and so forth. A user can point the camera of an electronic device at the physical target, and in response to the captured visual data (image data or video data) of the physical target, the electronic device can produce an augmented reality presentation that is based on the physical target.

The augmented reality presentation can include a visual output containing an image or video triggered based on the captured physical target, augmented with additional information (hereinafter referred to as "augmented reality content"). The augmented reality content can include audio data, further video data, further image data, text data, and so forth, that is added to the visual output. The visual output of the captured physical target can include an image or video of the captured physical target (the entirety of the captured physical target or a portion of the captured physical target), or a representation of the captured physical target, or different visual content. In cases where the visual output contains an image or video of the captured physical target or representation of the captured physical target, the further video data, further image data, and/or text data can overlay the visual output, while the audio data can be output as sound along with the visual output. An augmented reality presentation can thus be in the form of a multimedia presentation that can include the visual output of the captured physical target in addition to augmented reality content.

As an example, the electronic device when pointed at a given picture in a newspaper or magazine may cause an online electronic game to start playing. The given picture in the newspaper or magazine can be a game character, an advertisement, or other information associated with the online electronic game. The capture of such game character or other game information by the camera of the electronic device provides a trigger to the electronic device to start the online electronic game. As another example, the captured physical target can be a geographic landmark. Based on the capture of the geographic landmark, an augmented reality presentation can be triggered that can provide a virtual tour of the geographic landmark, augmented with image or video data, audio data, and/or text data that explain the historical significance of various aspects of the geographic landmark.

As a further example, the electronic device can capture a chess board, which can cause a chess game to come to life in an augmented reality presentation such that a user can start playing chess. As yet another example, the electronic device can capture a canvas, which can trigger an augmented reality presentation to allow paint brushes to be virtually made on the canvas. In other examples, other types of augmented reality presentations can be triggered by the capture of other types of physical targets.

In deciding whether or not to trigger an augmented reality presentation in response to captured visual data of a physical target, an object recognition process is performed in which the features of the captured visual data (of a physical target) can be compared to corresponding features of target images contained in a target image database. The process of comparing features of the captured visual data to corresponding features of target images in the target image database is referred to as a feature matching process.

A challenge in delivering augmented reality content to users is the difficulty associated with users finding and recognizing physical targets within captured visual data displayed in a display screen of an electronic device. Using the camera of the electronic device, visual data of an environment can be captured and displayed in the display screen of the electronic device. The environment may include a physical target that relates to an augmented reality presentation of interest to the user. However, the user may not recognize the physical target, and thus may have a hard time pointing the camera towards the location of the physical target.

In some cases, a trigger image relating to a respective augmented reality presentation can be selected by a user of an electronic device, such as a smart phone, a tablet computer, a notebook computer, or any other type of electronic device that has a display screen to present visual data and a camera to capture visual data of an environment in which the electronic device is located. When the electronic device that a user uses to view a trigger image is the same electronic device that is used for capturing visual data of an environment that includes a physical target for triggering an augmented reality presentation, it can be difficult for the user to remember specific details of the trigger image while the user is searching for the physical target in the displayed visual data of the environment. As a result, the user may not be able to easily find or recognize the physical target in the visual data of the environment that is being displayed in the display screen of the electronic device.

In accordance with some implementations of the present disclosure, techniques or mechanisms are provided to display guidance information relating to a target image in the display screen of the electronic device that also displays captured visual data of an environment, to assist the user in finding the physical target (corresponding to the target image) in the captured visual data of the environment.

Figure 1:
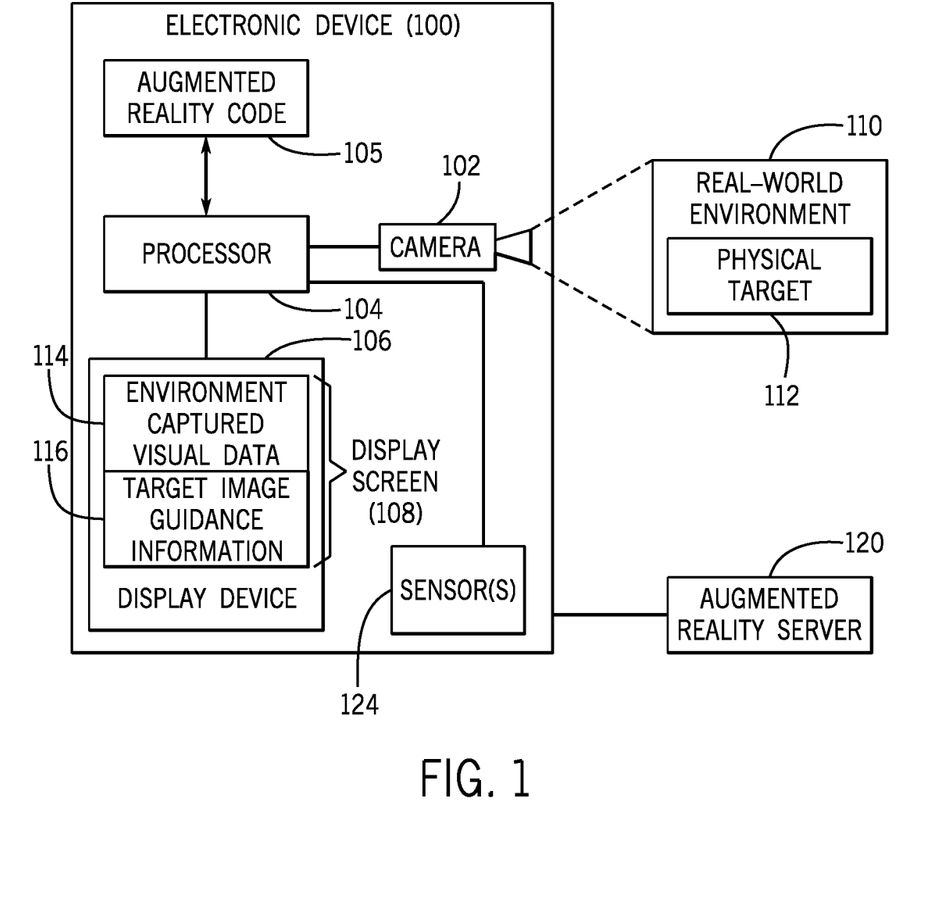
FIG. 1 is a block diagram of an arrangement including an electronic device and an augmented reality server, according to some examples.

FIG. 1 is a block diagram of an example electronic device 100 that includes a camera 102, a processor 104, and a display device 106 that includes a display screen 108. The display screen 108 can display information under control of the processor 104. The processor 104 can refer to a microprocessor, a core of a multi-core microprocessor, a microcontroller, a programmable integrated circuit device, a programmable gate array, or any other hardware processing circuit. The electronic device 100 can include machine-readable instructions that are executable on the processor 104 (or multiple processors 104) to perform various operations in the electronic device 100. For example, augmented reality code 105 (including machine-readable instructions) can be executed on the processor(s) 104 to cause display, in the display screen 108 of the display device 106, of augmented reality content.

The camera 102 can capture visual data ("visual data" can refer to image data or video data) of a real-world environment 110. The real-world environment 110 can include a physical target 112 that when captured and recognized causes the augmented reality code 105 to display an augmented reality presentation in the display screen 108.

However, as noted above, prior to capturing the physical target 112 for recognition by the electronic device 100, the user has to first locate such physical target 112 in the real-world environment 110 by searching for this physical target 112 in the captured visual data 114 (referred to as "environment captured visual data" in FIG. 1) of the real-world environment 110 captured by the camera 102 and displayed by the display screen 108.

In accordance with some implementations of the present disclosure, the processor 104 can also cause a target image guidance information 116 to be displayed concurrently with the environment captured visual data 114 in the display screen 108. The target image guidance information 116 includes information that relates to a target image that is to assist a user in finding a physical target, corresponding to the target image, in the environment captured visual data 114. The target image is an image that represents a physical target that is to be captured for invoking an augmented reality presentation. In some examples, the target image guidance information 116 can be presented by the augmented reality code 105. In other examples, the target image guidance information 116 can be presented by other code.

In some examples, the processor 104 can determine one or both of the position and orientation of the electronic device 100 based on the information from a sensor (or multiple sensors) 124 in the electronic device 100, where the sensor(s) 124 can include a Global Position System (GPS) receiver. A GPS receiver can receive information from GPS satellites that is used to derive a position of the electronic device 100. More generally, instead of a GPS receiver, the electronic device 100 can include another mechanism to determine the position of the electronic device 100. For example, the electronic device 100 can determine its position based on signals received from wireless access network nodes, such as base stations in a cellular network or access points of a WI-FI network.

The sensor(s) 124 can also include a gyroscope and/or an accelerometer, which can be used to determine an orientation of the electronic device 100 (i.e. where the electronic device 100 is pointed).

The processor 104 can trigger display of the target image guidance information 116 in response to the determined position and/or orientation of the electronic device 100. For example, if the processor 104 determines that the camera 102 of the electronic device 100 is pointed away from the physical target 112 or the electronic device 100 is too far away from the physical target 112, then the processor 104 can trigger the display of the target image guidance information 116.

When a physical target, such as the physical target 112, is scanned by the camera 102, an object recognition process can be invoked by the augmented reality code 105 to match the visual data of the physical target provided by the camera 102 to target images in a target image database. In some examples, the object recognition process can be performed by an augmented reality server 120. The augmented reality server 120 can store the target image database that includes trigger images that are to be compared to captured visual data of a physical target. For example, the augmented reality code 105 can communicate the captured visual data of a physical target to the augmented reality server 120, which can then attempt to match the captured visual data of the physical target to a target image of multiple target images in the target image database. When a match is made, the augmented reality server 120 can provide information regarding the matching target image to the electronic device 100, which can then trigger display of an augmented reality presentation at the augmented reality code 105.

In other examples, instead of performing the object recognition process at the augmented reality server 120, the matching can be performed at the electronic device 100 in examples where the target image database is stored in the electronic device 100.

Figure 2:
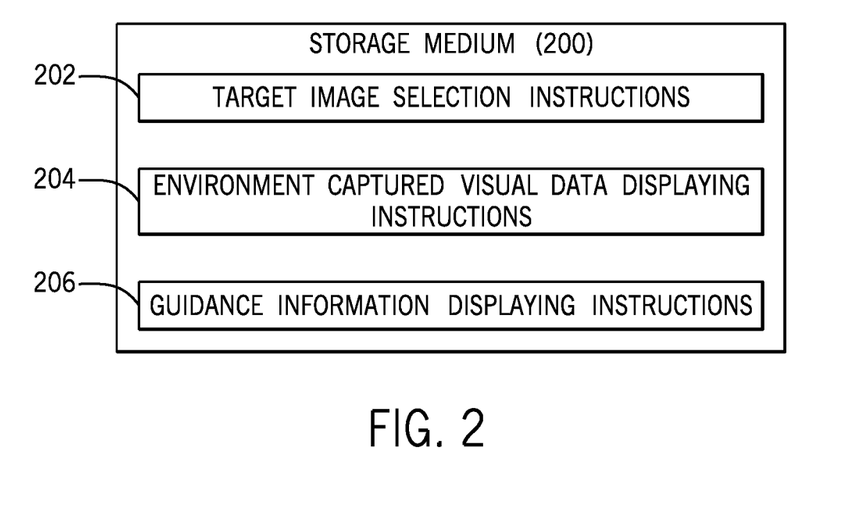
FIG. 2 is a block diagram of a non-transitory machine-readable or computer-readable storage medium storing instructions according to some examples.

FIG. 2 is a block diagram of an example non-transitory machine-readable or computer-readable storage medium 200 storing machine-readable instructions that upon execution cause the electronic device 100 to perform various tasks. The machine-readable instructions can include those of the augmented reality code 105 of FIG. 1, or other code, and can be executed by the processor(s) 104.

The machine-readable instructions include target image selection receiving instructions 202 to receive a selection of a target image relating to an augmented reality presentation. The selection of the target image can be responsive to a user selection, such as when a user is presented (such as in the display screen 108) with a list of multiple target images, and the user makes a selection in this list to select a given target image. In other examples, the selection of a target image relating to an augmented reality presentation can be responsive to the opening of an application in the electronic device 100. Multiple different applications can be associated with different target images. Thus, the opening (i.e. launching) of an application, such as in response to a invocation by a user, can result in the selection of the respective target image that relates to the opened application.

The machine-readable instructions further include environment captured visual data displaying instructions 204 to display, on a display screen of the electronic device, captured visual data (e.g. the environment captured visual data 114 in FIG. 1) of an environment acquired by the electronic device (more specifically, acquired by the camera of the electronic device).

The machine-readable instructions further include guidance information displaying instructions 206 to display, in the display screen, guidance information (e.g. the target image guidance information 116 of FIG. 1) relating to the target image to assist a user in finding a physical target, such as the physical target 112 (corresponding to the target image), in the captured visual data of the environment.

The target image guidance information 116 can include various different information. In some examples, the target image guidance information 116 can include the target image itself. Additionally or instead of the target image, the target image guidance information 116 can include text that describes the target image, such as the name of the target image or descriptive text that describes the target image.

Additionally or alternatively, the target image guidance information 116 can also include position information relating to the physical target to assist the user in re-positioning the electronic device 100 towards the location of the physical target. As examples, the position information can include any or some combination of the following: (1) the position information can indicate that the user is to move forward to get closer to the physical target, (2) the position information can indicate that the user is to re-orient the camera of the electronic device in a specific direction (e.g. to the left, to the right, up, down, etc.), and (3) the position information can indicate a structure (e.g. a fountain, a counter, a booth, etc.) that the physical target is adjacent.

To enable the provision of the position information, the augmented reality code 105 in the electronic device 100 can perform object recognition (either entirely within the electronic device 100 or in cooperation with the augmented reality server 120) of the environment captured visual data 114 to determine whether the physical target is within the view of the camera 102. For example, the augmented reality code 105 can determine that a partial view of the physical target is in the environment captured visual data 114. Based on this determination, the augmented reality code 105 can provide the position information as part of the target image guidance information 116 to ask the user to re-orient the camera 102 so that the physical target can be completely in the view. As another example, the augmented reality code 105 can determine that the physical target is far away from the electronic device 100, due to the size of the image of the physical target in the environment captured visual data 114. In this latter example, the augmented reality code 105 can provide position information to indicate that the user should move forward towards the physical object.

It is noted that the object recognition that is performed by the augmented reality code 105 (either entirely within the electronic device 100 or in cooperation with the augmented reality server 120) can provide a score that represents how likely the physical target in the environment captured visual data 114 matches the target image. If the environment captured visual data 114 includes a partial view or a far-away view of the physical target, then the matching score can be relatively low—the augmented reality code 105 can nevertheless provide the position information based on a match with a low score. If it turns out that a captured object is in fact not the physical target that corresponds to the target image of interest, then the searching can continue.

Figure 3A:
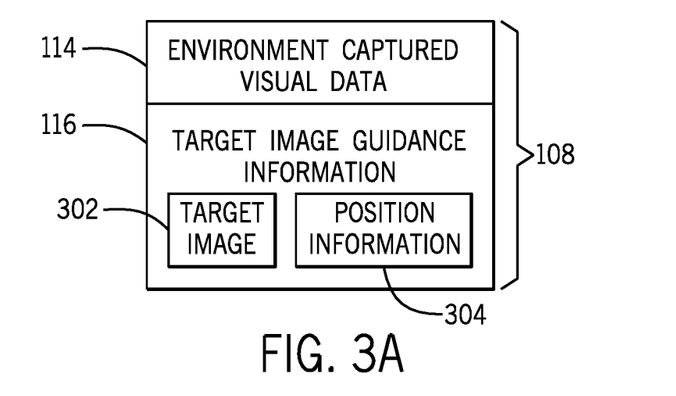
FIGS. 3A-3C illustrate examples of concurrently displayed guidance information relating to a target image and captured visual data of an environment, according to some examples.
Figure 3B:
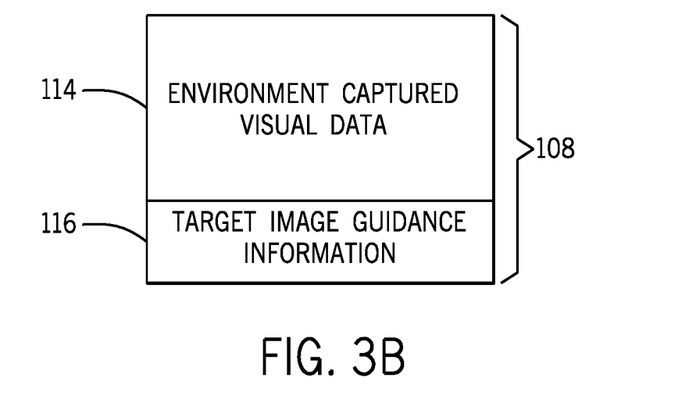
Figure 3C:
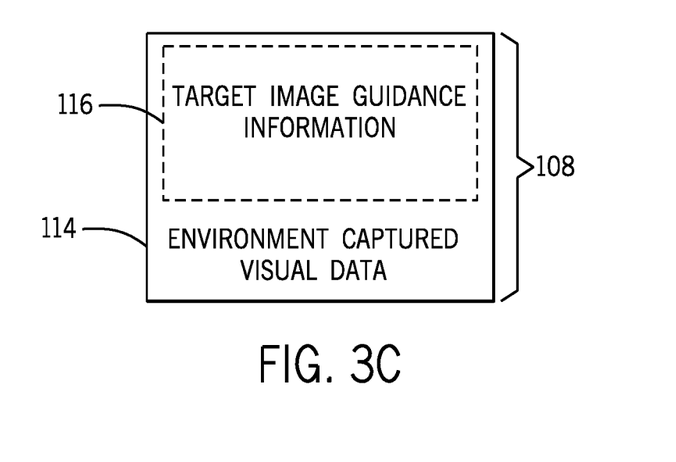

FIGS. 3A-3C illustrate different options associated with displaying the target image guidance information 116 in the display screen 108. In FIG. 3A, the target image guidance information 116 is displayed in a first portion of the display screen 108 that is larger than a second portion of the display screen 108 in which the environment captured visual data 114 is presented. By displaying the target image guidance information 116 in a larger display screen portion, more information can be presented to the user, including, for example, the target image 302 itself as well as text describing the target image, and position information 304 that provides an indication to a user of the location of a physical target.

FIG. 3B shows the target image guidance information 116 displayed in a first portion of the display screen 108 that is smaller than the second portion of the display screen 108 in which the environment captured visual data 114 is displayed. The target image guidance information 116 of FIG. 3B can include less information than what is included in the target image guidance information 116 of FIG. 3A. For example, if they fit within the smaller display screen portion in FIG. 3B, the target image guidance information 116 can include just the target image itself or just text data describing the target image.

FIG. 3C shows another example in which the target image guidance information 116 can be displayed as an overlay (e.g. a transparent or translucent overlay) that overlaps the environment captured visual data 114, which can occupy the entirety of the display screen 108. The target guidance information 116 that is displayed as an overlay over the environment captured visual data 114 in FIG. 3C can include the target image itself, as well as other information, such as position information.

In some examples, a user can select between the different options of FIGS. 3A-3C to view the target image guidance information 116 concurrently with the environment captured visual data 114. For example, a control element can be displayed in the display screen 108, where the control element is selectable by the user to choose between the different view options of the target image guidance information 116.

Figure 4:
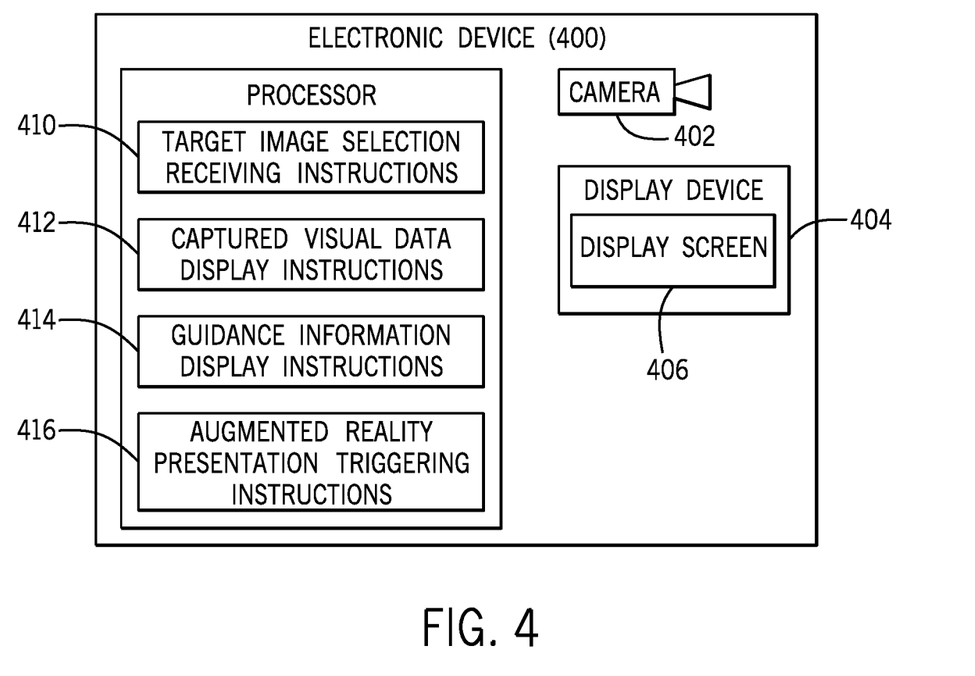
FIG. 4 is a block diagram of an electronic device according to some examples.

FIG. 4 is a block diagram of an example electronic device 400 according to further implementations. The electronic device 400 includes a camera 402 to capture visual data of an environment, and a display device 404 that includes a display screen 406. The electronic device 400 also includes a processor 408 that is to execute machine-readable instructions, where the executable machine-readable instructions include a target image selection receiving instructions 410 to receive selection of a target image relating to an augmented reality presentation; captured visual data display instructions 412 to cause display, in the display screen 406, of captured visual data of an environment; guidance information display instructions 414 to cause display of guidance information relating to the target image to assist a user in finding a physical target, corresponding to the target image, in the captured visual data of the environment; and augmented reality presentation triggering instructions 416 that are responsive to a capture visual data of the physical target to trigger presentation of the augmented reality presentation.

Figure 5:
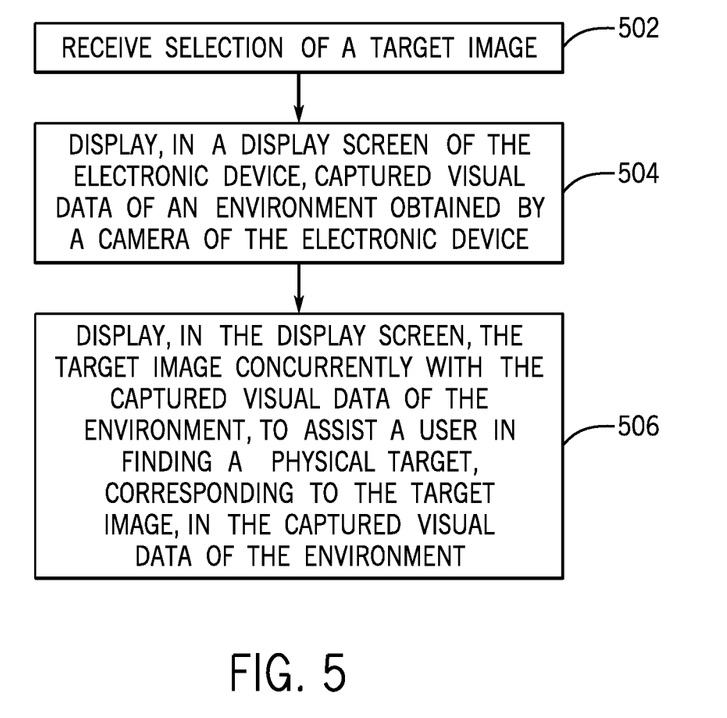
FIG. 5 is a flow diagram of a process according to some examples.

FIG. 5 is a flow diagram of an example process that can be performed by an electronic device according to further examples. The process of FIG. 5 includes receiving (at 502), by an electronic device, selection of a target image. The process of FIG. 5 further includes displaying (at 504), in a display screen of the electronic device, captured visual data of an environment obtained by a camera of the electronic device. The process of FIG. 5 also includes displaying (at 506), in the display screen, the target image concurrently with the captured visual data of the environment, to assist a user in finding a physical target, corresponding to the target image, in the captured visual data of the environment.

The storage medium 200 of FIG. 2 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory storage medium storing instructions that upon execution cause an electronic device to:
   receive user selection of a target image of a physical target that is to be captured in visual data of an environment for invoking to an augmented reality presentation;
   capture, by an electronic device, the visual data of the environment;
   display, in a display screen of the electronic device, the visual data of the environment as the visual data is captured;
   display, in the display screen, guidance information relating to the target image to assist a user in finding the physical target so that the captured visual data of the environment includes the physical target; and
   responsive to matching a candidate physical target in the captured visual data of the environment to the target image, trigger display of the augmented reality presentation in the display screen of the electronic device.

2. The non-transitory storage medium of claim 1, wherein the guidance information is displayed concurrently with the captured visual data of the environment.

3. The non-transitory storage medium of claim 2, wherein the guidance information is displayed in a first portion of the display screen, and the concurrently displayed captured visual data of the environment is displayed in a second, different portion of the display screen.

4. The non-transitory storage medium of claim 2, wherein the displayed guidance information is displayed as an overlay over the captured visual data of the environment in the display screen.

5. The non-transitory storage medium of claim 1, wherein the displayed guidance information comprises the target image.

6. The non-transitory storage medium of claim 1, wherein the displayed guidance information comprises position information to assist the user in re-positioning the electronic device towards the physical target.

7. The non-transitory storage medium of claim 6, wherein the candidate physical target is matched to the target image based on object recognition of the candidate physical target that includes receiving a score that indicates a likelihood of the candidate physical target matching the target image.

8. The non-transitory storage medium of claim 1, wherein the visual data of the environment is captured before and after the user has re-positioned the electronic device to focus on the physical target based on the guidance information.

9. The non-transitory storage medium of claim 1, wherein receiving the user selection of the target image comprises receiving the user selection:
   in response to user selection of the target image from among a plurality of target images presented in the display screen, or
   in response to opening an application in the electronic device.

10. An electronic device comprising:
    a camera to capture visual data of an environment;
    a display device comprising a display screen; and
    a processor to:
      receive user selection of a target image of a physical target that is to be captured in the visual data of the environment for invoking an augmented reality presentation;
      cause display, in the display screen, of the visual data of the environment as the visual data is captured;
      cause display, in the display screen, guidance information relating to the target image to assist a user in finding the physical target so that the captured visual data of the environment includes the physical target; and
      responsive to matching a candidate physical target in the captured visual data of the environment to the target image, trigger presentation of the augmented reality presentation.

11. The electronic device of claim 10, wherein the displayed guidance information includes the target image.

12. The electronic device of claim 10, wherein the displayed guidance information includes position information indicating a location of the physical target.

13. The electronic device of claim 10, wherein the processor is to further determine one or both of a position and an orientation of the electronic device, and to trigger display of the guidance information based on one or both of the position and the orientation of the electronic device.

14. A method comprising:
    receiving, by an electronic device, user selection of a target image of a physical target that is to be captured in visual data of an environment for invoking an augmented reality presentation;
    displaying, in a display screen of the electronic device, the visual data of the environment as the visual data is captured by a camera of the electronic device; and
    displaying, in the display screen, the target image concurrently with the captured visual data of the environment, to assist a user in finding the physical target so that the captured visual data of the environment includes the physical target; and
    responsive to matching a candidate physical target in the captured visual data of the environment to the target image, triggering display of the augmented reality presentation in the display screen of the electronic device.

15. The method of claim 14, further comprising:
    displaying, in the display screen, position information that indicates a location of the target image relative to the electronic device.

* * * * *